US008694656B2

(12) United States Patent
Douillet et al.

(10) Patent No.: US 8,694,656 B2
(45) Date of Patent: Apr. 8, 2014

(54) SYSTEM AND METHOD FOR CREATING A VIEWING SOCIAL NETWORK

(75) Inventors: Ludovic Douillet, Escondido, CA (US); Bryan Mihalov, San Diego, CA (US); Aran Sadja, San Diego, CA (US); Nobukazu Sugiyama, San Diego, CA (US); Jeffrey Tang, San Diego, CA (US)

(73) Assignee: Sony Corporation, Tokyo (JP)

( * ) Notice: Subject to any disclaimer, the term of this patent is extended or adjusted under 35 U.S.C. 154(b) by 213 days.

(21) Appl. No.: 13/108,977

(22) Filed: May 16, 2011

(65) Prior Publication Data

US 2012/0117144 A1 May 10, 2012

Related U.S. Application Data

(60) Provisional application No. 61/411,627, filed on Nov. 9, 2010.

(51) Int. Cl.
*G06F 15/16* (2006.01)

(52) U.S. Cl.
USPC ............................ 709/228; 709/205; 709/229

(58) Field of Classification Search
USPC .................. 709/202, 203, 204, 205, 206, 228
See application file for complete search history.

(56) References Cited

U.S. PATENT DOCUMENTS

| | | | |
|---|---|---|---|
| 5,604,896 A | 2/1997 | Duxbury et al. | |
| 6,219,835 B1 | 4/2001 | House | |
| 7,165,239 B2 | 1/2007 | Hejlsberg et al. | |
| 7,272,836 B1 | 9/2007 | Taylor | |
| 7,290,267 B2 | 10/2007 | Brown et al. | |
| 7,293,107 B1 | 11/2007 | Hanson et al. | |
| 7,581,231 B2 | 8/2009 | Smith et al. | |
| 7,620,958 B2 | 11/2009 | Carrell et al. | |
| 7,685,132 B2* | 3/2010 | Hyman | 707/999.01 |
| 7,725,460 B2 | 5/2010 | Seitz et al. | |
| 7,725,494 B2 | 5/2010 | Rogers et al. | |
| 7,730,216 B1* | 6/2010 | Issa et al. | 709/250 |

(Continued)

FOREIGN PATENT DOCUMENTS

CN 101631311 1/2010

OTHER PUBLICATIONS

Sadja et al.: U.S. Appl. No. 13/108,973, filed May 16, 2011.

(Continued)

*Primary Examiner* — Gary Mui
*Assistant Examiner* — Kabir Jahangir
(74) *Attorney, Agent, or Firm* — Fitch, Even, Tabin & Flannery LLP

(57) ABSTRACT

A system and method for detecting a user operating a first client device at an intermediary server communicatively coupled to one or more client devices including the first client device and further communicatively coupled to one or more other intermediary servers each communicatively coupled with one or more other client devices, establishing communication with at least one social networking server maintaining information corresponding to the user comprising one or more of user preferences, a plurality of user connections, and user connection preferences corresponding to each of the plurality of user connections, querying the at least one social networking server for the information, receiving the information and generating a local viewing social network for the user comprising generating a user profile according to the information, detecting one or more local connections and establishing direct communication between the user and at least one of the one or more local connections.

17 Claims, 8 Drawing Sheets

(56) References Cited

U.S. PATENT DOCUMENTS

| | | | |
|---|---|---|---|
| 7,739,723 B2 | 6/2010 | Rogers et al. | |
| 7,757,250 B1 | 7/2010 | Horvitz et al. | |
| 7,805,533 B2 | 9/2010 | Burns et al. | |
| 7,822,865 B2 | 10/2010 | Dowling | |
| 8,307,395 B2 * | 11/2012 | Issa et al. | 725/46 |
| 2002/0059201 A1 | 5/2002 | Work | |
| 2002/0184407 A1 | 12/2002 | Shell et al. | |
| 2003/0014759 A1 * | 1/2003 | Van Stam | 725/97 |
| 2005/0177380 A1 | 8/2005 | Pritchard et al. | |
| 2006/0059260 A1 * | 3/2006 | Kelly et al. | 709/225 |
| 2006/0224446 A1 | 10/2006 | Fox | |
| 2006/0271959 A1 * | 11/2006 | Jacoby et al. | 725/46 |
| 2007/0011236 A1 | 1/2007 | Ravula | |
| 2007/0220081 A1 | 9/2007 | Hyman | |
| 2008/0119277 A1 | 5/2008 | Thelen | |
| 2008/0126303 A1 | 5/2008 | Park et al. | |
| 2008/0183694 A1 | 7/2008 | Cane et al. | |
| 2009/0292814 A1 * | 11/2009 | Ting et al. | 709/229 |
| 2009/0299963 A1 * | 12/2009 | Pippuri | 707/3 |
| 2009/0307345 A1 | 12/2009 | Carter et al. | |
| 2010/0005520 A1 * | 1/2010 | Abbot et al. | 726/6 |
| 2011/0010453 A1 | 1/2011 | Roy | |
| 2011/0066507 A1 | 3/2011 | Iyer et al. | |
| 2012/0030587 A1 * | 2/2012 | Ketkar | 715/751 |

OTHER PUBLICATIONS

Non-Final Rejection in U.S. Appl. No. 13/108,973 dated Mar. 4, 2013 (11 pages).
Final Rejection in U.S. Appl. No. 13/108,973 dated Sep. 6, 2013 (12 pages).
Notification of First Office Action for Chinese Patent Application No. 201110317342,2 mailed by the State Intellectual Property Office of the People's Republic of China on Jan. 6, 2014.

\* cited by examiner

SYSTEM AND METHOD FOR CREATING A VIEWING SOCIAL NETWORK

This application claims the benefit of U.S. Provisional Application No. 61/411,627, filed Nov. 9, 2010, entitled "Social Networking for Sony Client Devices" which is incorporated in its entirety herein by reference.

This application relates to U.S. patent application Ser. No. 13/108,973, which is incorporated herein by reference in its entirety.

BACKGROUND OF THE INVENTION

As consumers face larger catalogues of content from a growing number of providers, the use of traditional mechanisms for navigating and discovering new content becomes increasingly challenging and ineffective. One of the most common and trusted methods that consumers discover new content is by word of mouth. Until now social sharing of media has not been readily accessible on consumer electronics devices.

SUMMARY OF THE INVENTION

In one embodiment, the invention can be characterized as a method comprising detecting a user operating a first client device at an intermediary server, wherein the intermediary server is communicatively coupled to one or more client devices including the first client device and further communicatively coupled to one or more other intermediary servers each communicatively coupled with one or more other client devices, establishing communication with at least one social networking server maintaining information corresponding to the user, the information comprising one or more of user preferences, a plurality of user connections, and user connection preferences corresponding to each of the plurality of user connections, querying the at least one social networking server for the information, receiving the information and generating a local viewing social network for the user comprising generating a user profile according to the information, detecting one or more local connections of the plurality of user connections operating a client device of the one or more client devices or the one or more other client devices and establishing direct communication between the user and at least one of the one or more local connections.

In another embodiment, the invention can be characterized as a system comprising one or more intermediary servers communicatively coupled to one another and each of the one or more intermediary servers further communicatively coupled to one or more client devices, at least one of the one or more intermediary servers comprising a processor configured to perform steps comprising detecting a user operating a first client device of the one or more client devices communicatively coupled to the at least one of the one or more intermediary servers, establishing communication with at least one social networking server maintaining information corresponding to the user, the information comprising one or more of user preferences, a plurality of user connections, and user connection preferences corresponding to each of the plurality of user connections, querying the at least one social networking server for the information, receiving the information and generating a local viewing social network for the user comprising generating a user profile according to the information, detecting one or more local connections of the plurality of user connections operating a client device of the one or more client devices communicatively coupled to the one or more intermediary servers and establishing direct communication between the user and at least one of the one or more local connections.

In a further embodiment, the invention may be characterized as a tangible non-transitory computer readable medium storing one or more computer readable programs adapted to cause a processor based system to execute steps comprising detecting a user operating a first client device at an intermediary server, wherein the intermediary server is communicatively coupled to one or more client devices including the first client device and further communicatively coupled to one or more other intermediary servers each communicatively coupled with one or more other client devices, establishing communication with at least one social networking server maintaining information corresponding to the user, the information comprising one or more of user preferences, a plurality of user connections, and user connection preferences corresponding to each of the plurality of user connections, querying the at least one social networking server for the information, receiving the information and generating a local viewing social network for the user comprising generating a user profile according to the information, detecting one or more local connections of the plurality of user connections operating a client device of the one or more client devices or the one or more other client devices and establishing direct communication between the user and at least one of the one or more local connections.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings.

Figure 1:
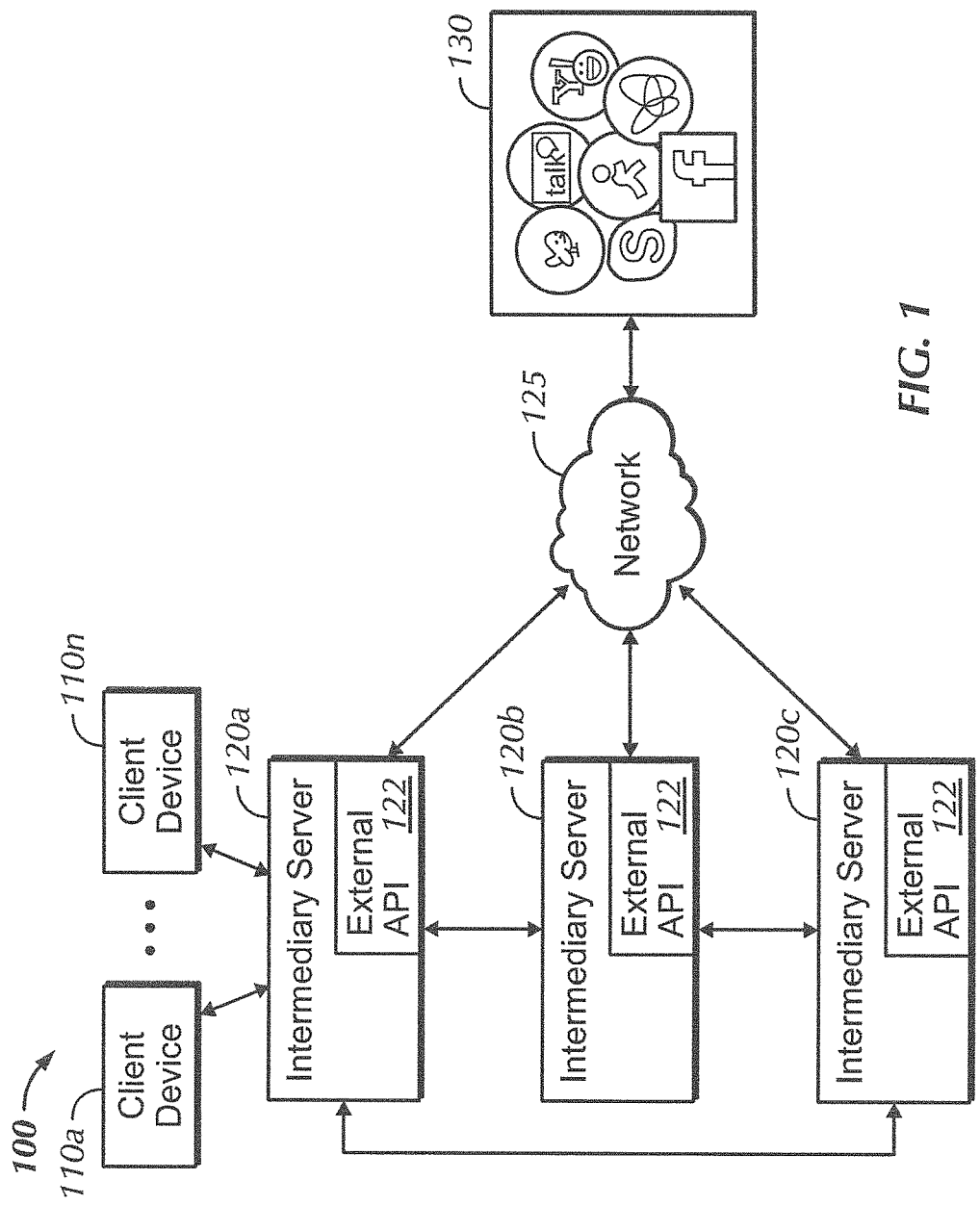
FIG. 1 is an exemplary embodiment of an environment within which the methods and apparatuses of the present invention are implemented according to several embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

As consumers face larger catalogues of content from a growing number of providers, the use of traditional mechanisms for navigating and discovering new content becomes increasingly challenging and ineffective. One of the most common and trusted methods that consumers discover new content is by word of mouth. By creating a network of consumers and their devices, according to the embodiments of the present invention, the present system provides a convenient and personalized mechanism for sharing of media preferences and media consumption patterns. Until now social sharing of media has not been readily accessible on consumer electronics devices. The present invention, in one embodiment, provides methods and techniques for creating a viewing social network accessible at user electronics devices such as televisions, DVD or BluRay players, and other devices.

In many instances, the API for communicating between most social networking clients and social networking servers is updated frequently requiring the client devices executing the social networking clients to update the social networking clients each time the API is updated. In several embodiments, the present invention further provides an intermediary between the social networking client executed on the client device and the social networking server. This intermediary (which may be in the form of an intermediary server executed on an intermediary device) is communicatively coupled to one or more client devices as well as one or more social networking servers and provides the client devices a means for communicating with the social networking server and performing interactions with the social networking server, without the need for updating the social networking client at the client device.

The present invention, in accordance with some embodiments, provides methods and techniques for creating a viewing social network for such client devices, and further provides an infrastructure, users, and most importantly interconnections between users needed to create such viewing social network. In one embodiment, the infrastructure for implementing such viewing social network includes one or more intermediary servers, for example executed on one or more intermediate devices, to communicate with the client devices and one or more social networking servers and to maintain information associated with the viewing social network. In one embodiment, the viewing social network comprises user information for one or more users, as well as connections between the users of the viewing social network.

In one embodiment, the viewing social network comprises a local network of users and their local connections, i.e., affiliated users the user is in communication with or maintains some relationship with similar to friends or connections on Facebook or LinkedIn. The viewing social network focuses on creating a social networking environment, which focuses on media consumption preferences, patterns and recommendations and allow interaction between connections, i.e., affiliated users, with respect to media content.

To create the viewing social network, the present invention, in accordance with some embodiments, provides a method to create connections between users of the viewing social network. Creating these connections independently is an onerous task for users, requiring the users to manually create a profile, and enter email addresses, names, and/or other identifier(s) of affiliated users, in order to create connections for the user. This process requires both time in initial preparation, as well as time to create an established profile with a good number of connections, since the connections must be built through other connections, and must allow time for authorization and acceptance by the user on the other side of the relationship.

In several embodiments, the present system provides an automated method of creating a social viewing network for a user by accessing already existing user connections created by the user and maintained and stored by social networking servers such as Facebook, Twitter, LinkedIn, and the like. In one embodiment, creating such connections comprises accessing a social networking server having stored therein connection information associated with the user comprising a list of user's connections created at the social networking server, and importing the connection information stored by these social networking servers to create a viewing social network for the user including several local connections. In one embodiment, the local connections of the user are limited to other users of the social viewing network or other users operating client devices communicatively coupled to the intermediary server either directly or through another intermediary server. In several embodiments, the methods and techniques for automated creation of the viewing social network avoids and/or minimizes requiring the user to create another online profile and establish new connections, while allowing the user to quickly have access to connections and information regarding the connections needed to enhance their media consumption experience.

Referring first to FIG. 1, one embodiment of an environment within which the methods and apparatuses of the present application are implemented is illustrated, according to several embodiments of the present invention.

As shown, in one embodiment, the environment comprises one or more client devices 110a-110n operated by one or more users. In one embodiment, each device is in communication with an intermediary server 120a, 120b or 120c. In further embodiments, as shown in FIG. 1, the intermediary servers 120a, 120b and 120c are in communication with one or more social networking servers 130 through a network 125.

In one embodiment, the client devices 110a-100n may comprise entertainment devices, game consoles, home appliances, mobile phones, handheld devices, tablets, personal computers, and/or other consumer electronics devices. For simplicity FIG. 1 only illustrates client devices 110a-110n coupled to the intermediary server 120a. According to several embodiments, each of the intermediary servers 120a, 120b or 120c is communicatively coupled with one or more client devices.

In one embodiment, as shown in FIG. 1, each of the intermediary servers 120a, 120b and 120c is in direct communication with one or more client devices 110 and one or more social networking servers 130. According to several further embodiments, each of the intermediary servers 120a, 120b and 120c is further communicatively coupled to the other intermediary servers as shown in FIG. 1.

For the purpose of describing exemplary embodiments of the present invention the client devices 110a-110n, as well as other client devices that may be communicatively coupled to intermediary servers 120a, 120b and 120c, and are generally referred to as client device 110. Furthermore, the intermediary servers 120a-120c are herein referred to generally as the intermediary server 120. However, it should be understood that one or more of the client devices and/or intermediary servers might comprise additional or alternative functionalities, while still functioning according to the embodiments of the present invention. Furthermore, while FIG. 1 only illustrates three intermediary servers 120a, 120b and 120c, in other embodiments the system may comprise any number of intermediary servers, each communicatively coupled to one or more client devices and other intermediary servers, depending on the number of devices, as well as other system characteristics. For example, in one embodiment, the system may be implemented with one intermediary server 120 supporting all of the client devices, while in another embodiment, more than three intermediary servers, communicatively coupled to one another may be employed. It should be understood that the number of intermediary servers 120 is a function of the preferences of the system developers and/or based on system requirements, and that the number of intermediary servers may vary in different implementations of the present invention.

In one or more embodiments, each client device 110 may comprise means for establishing communication and transmitting and/or receiving content and/or messages from an intermediary server 120, either through a wire and/or through wireless communication. In another embodiment, one or more client devices 110 may be connected to another client device 110 by means such as an HDMI or VGA cord, electrical connection, power network, etc., and may send and receive content and/or messages to and from the intermediary server 120 through the other client device.

In one embodiment, the intermediary servers 120a, 120b, and 120c manage all communication to and from these client devices 110. In another embodiment, one or more client devices may further have a separate, direct communication channel with one or more other client devices in addition to or instead of the communication established through the intermediary server 120. In one embodiment, the client devices 110 may have the capability to discover one another and establish communication with one another. In one embodiment, device discovery may be performed through the server, while in another embodiment the device discovery is performed directly without going through the intermediary server.

Once communication is established between the one or more client devices, the client devices are then capable of performing one or more functionalities including, chatting, voice messaging, presence inquiries and updates, content sharing and synchronization, device control and system messages.

In several embodiments, to provide real time communication between users and their local connections, i.e., connections within the viewing social network, the system may employ various communication protocols and or instant messaging solutions, such as the open XMPP standard, SIP, HTTP polling and or a proprietary communication protocol, to permit real time peer-to-peer interactions. In one or more embodiments, the system uses a communication protocol allowing for real time and/or persistent communication for sending and receiving communications between the one or more client devices 110. Additionally, in several embodiments, the system may support "push" notifications and update events to provide immediate feedback for actions taken by the user's connections. In one embodiment, the system may employ communication protocols, such as XMPP, SIP, HTTP, or similar communication protocols, and/or a proprietary protocol, to support such "push" notifications and update events. In one embodiment, for example, push notifications may be received from the user operating a client device and may be forwarded to one or more other client devices 110 and/or may be provided to a social networking server 130. Push notifications and update events may refer to actions taken by a user at the client device, such as selecting content for viewing. In such embodiments, the update notifications may be used at the social networking server to update the user profile maintained at the social networking server.

In one embodiment, peer-to-peer communication is implemented through a server acting as a proxy to allow users within the viewing social network generated and maintained according to one embodiment of the present invention to communicate with one another, receive viewing recommendations, such as content recommendations, and/or provide updates regarding their viewing habits, i.e., current content being utilized at the client device of the user, history of content utilized at the client device of the user, content preferences of the user, etc., to one another. For example, in one embodiment, the peer-to-peer communication may be implemented through an XMPP, SIP, HTTP, or other such server implementations. In other embodiments, a proprietary communication protocol and/or server implementation may be employed to enable peer-to-peer communication.

Figure 2:
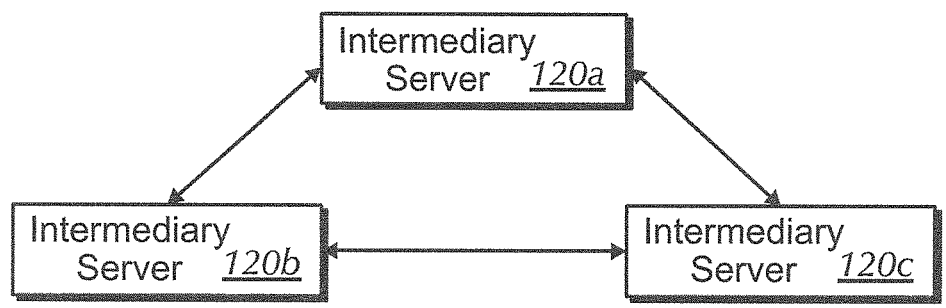
FIG. 2 is an exemplary diagram of the local server implementation for enabling peer-to-peer communication, according to several embodiments of the present invention.

FIG. 2 illustrates an exemplary diagram of the local intermediary server implementation, for facilitating peer-to-peer communication between client devices, according to several embodiments of the present invention. In one embodiment, the system comprises one or more intermediary servers 120, e.g., intermediary servers 120a, 120b and 120c, in communication with one another. Each of the intermediary servers 120 acts as the intermediary server for one or more client devices 110, e.g., as shown in FIG. 1, intermediary server 120a acts as an intermediary server for client device 110a-110n. In one embodiment, the one or more intermediary servers 120a, 120b and 120c are configured to facilitate communications between the client devices, and may allow for real time peer-to-peer communication. For example, in one embodiment such communications may be facilitated through a communication protocol such as the XMPP messaging protocol, HTTP polling, SIP messaging protocol or a proprietary communication protocol. In one embodiment, for example, where the communication is implemented through the XMPP protocol, the infrastructure for implementing XMPP communication through the intermediary servers is based upon an open source customizable XMPP server. In alternative embodiments, other server implementations may be used for implementing XMPP communication through the intermediary server. Furthermore, where other communication protocols are used for facilitating communication, the server implementation may be varied based upon the specific communication protocol used to facilitate communication.

In instances, where there are more than one intermediary server within the system, each intermediary server maintains an open communicational coupling to each other intermediary server in order to quickly and efficiently pass messages from a user operating a client device maintained by a first intermediary server to a user at a second client device communicatively coupled to a second intermediary server. For example, when a first user operating a first client device, coupled to the intermediary server 120*a*, sends a message to a second user operating a second client device coupled to the intermediary server 120*c*, the intermediary server 120*a* must transmit that message to both the intermediary server 120*b* and the intermediary server 120*c* in order to find the second client device operated by the second user. According to several embodiments of the present invention, once the second user/second device has been found, the intermediary server 120*a* will optimize the delivery, by sending all response messages intended for the second device and/or second user directly to intermediary server 120*c*. This avoids duplication of messages yet allows each server in the cluster to maintain a lookup table of only its directly connected clients, reducing the memory footprint per server and improving the scalability by limiting the traffic on the backend system.

Referring back to FIG. 1, as shown, in one embodiment, the one or more intermediary servers 120 comprise an external API module 122 for communicating with the social networking servers 130 through the network 125. In one embodiment, the external API module 122 is configured to establish communication with one or more of the social networking servers 130 for receiving a list of user's connections, media preferences information regarding users of the social networking site maintained by the social networking server 130, and/or providing updates regarding media consumption of the user to a social networking server 130. In one embodiment, each of the one or more social networking servers 130 maintain information corresponding to a user, i.e., a user operating the client device 110. In one embodiment, the information may comprise one or more of user preferences, user connections, and user connection preferences. In one embodiment, the user preferences and connection preferences comprise preference information regarding types of media content preferred by users of the social networking server, including the user and his/her connections, i.e., friends, members of affiliated groups, etc.

Social networking servers, such as Facebook, Twitter, Mixi, have spent years building connections between users. In most instances, the social networking servers comprise API support, which allows the intermediary servers 120 to communicate with the social networking servers 130 and obtain media preference information regarding the user and their connections maintained at the social networking servers to generate a viewing social network containing local connections, according to the obtained information. By establishing communication with social networking servers, the present system may rapidly create connections between the user and users at other client devices.

In further embodiments, depending on API functionalities supported by the social networking server, the present system may further be able to retrieve information including profile information as well as posts, comments, status updates, etc., maintained at the social networking server, that users share, such as their habits, likes, and dislikes, e.g., favorite TV shows, movies, music, books, etc. According to several embodiments, this retrieved profile information may be employed for instance to create content recommendations for the user within the viewing social network. The content recommendation may for example include TV programming, movies and/or other media content that may be recommended to the user.

For example, in one embodiment, the retrieved information may be used to compare what a user and user's connections, e.g., friends, have indicated as their media preferences, e.g., favorite TV programming/shows, movies, music and or other media content against media content available to be provided to the user, e.g., current TV programming, movies, streaming content, etc. Any matches may then be provided as "content recommendations" for the user operating the client device. In one embodiment, the comparison may comprise determining one or more characteristics of the media content preferences of the user and their connections maintained at social networking servers 130, such as genre, title, actors, artists, etc. These characteristics may be compared against a list of available media content available to the user at the client device to determine similar media content, i.e., matches, and to provide the user with recommendations.

In one embodiment, the content recommendations comprise TV programming, movies, music, video clips, advertisements and/or other media content. Furthermore, in embodiments, the system further enables the user to instantly send specific recommendations to a friend/connection or to all friends/connections within the viewing social network. In additional or alternative embodiments the user is further able to share what they are currently watching with all of their local connections within the viewing social network. As such, the present system further provides a new method of browsing based on what the user's local connections are currently watching. In one embodiment, for example, such communication may be enabled using a communication protocol such as XMPP, SIP, HTTP, and/or other similar communication protocols allowing for real time and/or persistent communication. In another embodiment, communication may be facilitated using a proprietary communication protocol. In one embodiment, the communication protocol provides for persistent real time communication between the one or more local connections within the viewing social network.

In some embodiments, the system of the present invention provides the user with a more sophisticated media utilization experience, for example, by integrating the content recommendation functionality described above into existing media viewing services such as web based media content providers, which provide streaming content to a user through an internet connection, web browser or through on-demand services. For example, the recommendation functionality described above may be integrated into web based on demand media content provider applications such as Qriocity and Amazon.

In such embodiments, for example, the user at the client device, viewing web based streaming content, may be presented with recommendations based on the media preferences information retrieved from the social networking servers 130 as well as from one or more local connections. For example, media preferences stored at the social networking servers which comprise favorite movies, TV programs, music, etc., may be compared against the streaming content available to the user, and recommendations may be provided to the user. In one embodiment, the comparison may comprise determining one or more characteristics of the media content preferences of the user and their connections available at the social networking servers 130, such as genre, title, actors, artists, etc., and these characteristics may be compared against a list of available media content at the local device operated by the user, to provide the user with recommendations. In one embodiment, the present system thus provides the user at the client device with instant recommendations through information comprising media content preferences information retrieved from the social networking servers 130 and/or from local connections at the viewing social network. In another embodiment, as described above, users may shared the media content they are currently watching with their local connections at the viewing social network. Thus the present system further provides an opportunity for recurring revenue as each user shares what they are watching with their local connections, therefore creating a similar effect as word of mouth media recommendations.

Thus, according to one embodiment, by communication with the existing social networking servers and retrieving existing user connections and preferences information stored within the social networking servers, automated creation of a viewing social network for users operating such client devices can be accomplished through the intermediary servers 120 which supports communication with one or more social networking servers 130 as well as one or more client devices 110. In one embodiment, the intermediary server 120 is configured to query the social networking server 130 for user information and a list of user's connections associated with the user operating a client device 110. In an additional or alternative embodiment, the intermediary server 120 is further configured to provide the social networking server 130 with update data regarding actions taken by the user operating the client device. In yet a further embodiment, the present system allows for push notifications and update events to provide immediate feedback for actions taken by users and user's local connections within the viewing social network.

In one embodiment, the standard HTTP methods of communication are used to enable communication between the intermediary server 120 and the social networking servers 130. In one embodiment, communication between the intermediary server 120 and various social networking servers 130 and retrieving information and/or content preferences information is performed using the HTTP protocol. In one embodiment, the HTTP protocol is used for all communications with the social networking servers 130, such as Facebook, Twitter, and the like. According to several embodiments, each of these social networking servers 130 provides an HTTP based API for accessing the user profile, media preference information and connections their users have created. In one or more embodiments, HTTP based APIs may also be used to indicate to the intermediary server 120 when additional social networking servers 130 are available, such that future social networking servers can be added dynamically to the list of social networking servers 130 and may be accessed to retrieve user related information.

Figure 3:
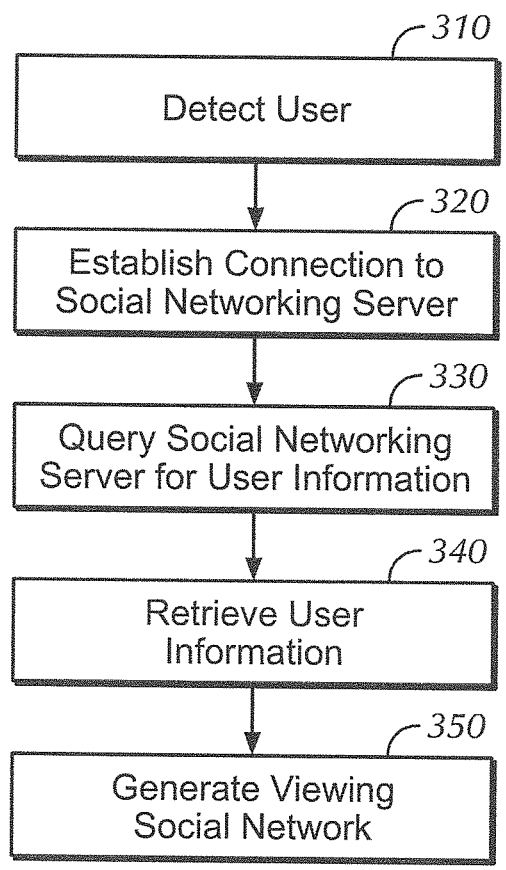
FIG. 3 is a flow diagram of a method for establishing communication with the social networking server and retrieving user data according to several embodiments of the present invention.

Referring to FIG. 3, a flow diagram of a method for establishing communication with the social networking server and retrieving user information is illustrated, according to several embodiments of the present invention.

The method begins in step 310 when the intermediary server 120 detects a first user operating a first client device 110 coupled to the intermediary server 120, wherein the intermediary server 120 is coupled to one or more client devices 110 including the first client device. In one embodiment, for example, a user operating a client device may initialize the process of creating a viewing social network profile, i.e., user profile within the viewing social network. Thus in one embodiment, detecting the user comprises detecting that the user wishes to establish a viewing social network profile. In one embodiment, the request is detected upon the user accessing a web site or menu option associated with the intermediary server and/or the viewing social network.

Upon detecting the user, in step 320, the intermediary server 120 attempts to establish communication with a social networking server 130, maintaining information corresponding to the user. In one embodiment, as described above, the information comprises media preference information and/or user's list of connections maintained at the social networking server 130. In one embodiment, the standard HTTP methods of communication are used to enable communication between the intermediary server 120 and the social networking server 130. In one embodiment, the HTTP protocol is used for some or all of the communications with the social networking servers 130, such as Facebook, Twitter, and the like. Each of social networking servers, according to some embodiments, provides an HTTP-based API for accessing the information and connections their users have entered and/or created.

Figure 4:
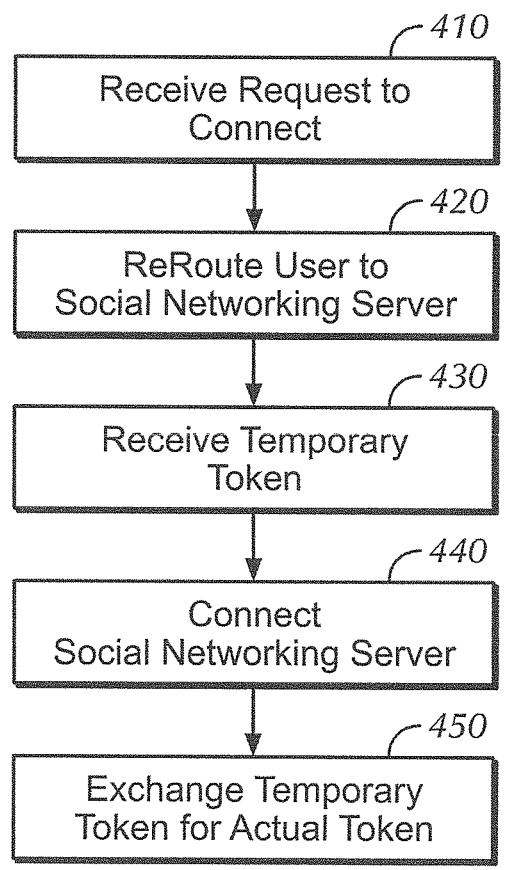
FIG. 4 is a flow diagram of the process for establishing communication with one or more social networking servers according to several embodiments of the present invention.
Figure 5:
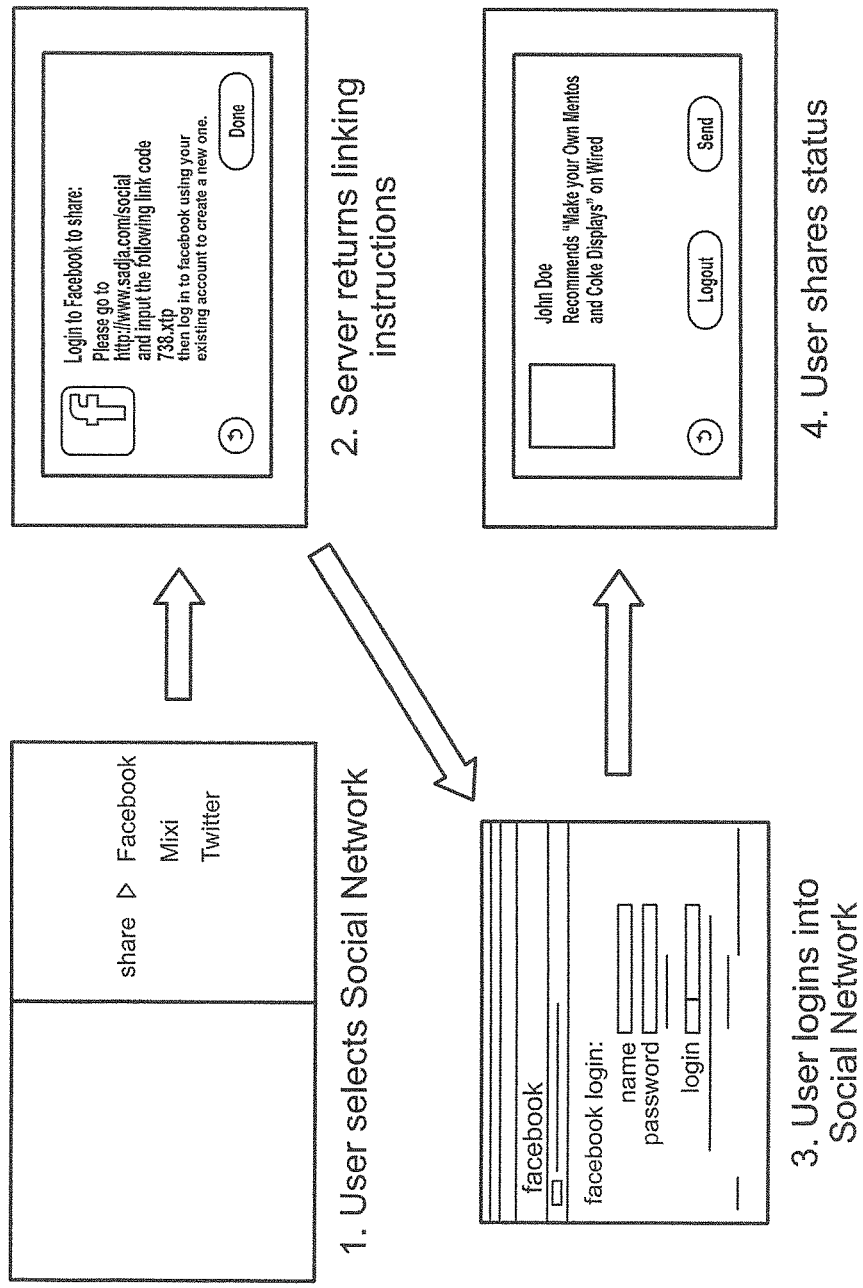
FIG. 5 illustrates exemplary screen shots of the process flow for connecting to the social networking server as it appears to the user according to several embodiments of the present invention.

The process of initially establishing communication with a social networking server is described in further detail with respect to FIGS. 4 and 5. In one embodiment, at the conclusion of step 320, the intermediary server 120 is in direct communication with one or more social networking servers 130 and may send one or more commands, or queries to the social networking clients at the client devices through the external API module 122.

Next, in step 330, the intermediary server 120 queries the social networking server 130 for the information corresponding to the user, i.e., media preferences information and/or a list of user's connections. In one embodiment, the intermediary server 120 is configured to query the social networking server 130 for connection information associated with the user. In one embodiment, for example, the information comprises one or more of user preferences, user connections and user connection preferences. In one embodiment, user connections refer to the user's friends and/or affiliations as maintained at the social networking server 130. According to several embodiments the user preferences and user connection preferences comprise media preferences such as favorite TV programs, movies, music, etc., as well as preferred genres of media.

For example, in some instances, users of social networking sites, maintained by social networking servers 130, indicate favorite movies, music, and TV programs as part of their profile information. In other instances, users may post information to the social networking sites, maintained by the social networking servers 130, such as status updates or comments, that indicate a preference for different types of media content. In one embodiment, the social networking servers 130 may collect and store such information and further may provide API functionality such that the intermediary server 120 can retrieve such information.

In one embodiment, the process of querying the social networking server may comprise determining one or more commands supported by API functionality of the social networking server and querying the social networking server by providing the API calls/commands to the social networking server 130.

Next, in step 340, the intermediary server retrieves information corresponding to the user maintained at the social networking server 130 including user information comprising media content preferences. In one embodiment, the information may comprise information retrieved from the user profile maintained at the social networking server 130, including the user's media preferences as well as a list of the user's connections. In one embodiment, the user connections comprise other users of the social networking server interconnected with the user. For example, such connections may comprise friends, group members, users of affiliated pages, etc. Additionally, in many instances, the information further comprises information regarding the user's connections, e.g., friends at the social networking server 130.

In one embodiment, the information regarding the user's connections retrieved from the social networking server 130 comprises information that would typically be available to the user directly through the social networking server 130. For example, the information accessible comprises information that is accessible in view of privacy rules and settings set by users at the social networking server 130. That is, in some embodiments, users of social networking sites, maintained by the social networking servers 130, may set certain restrictions on access to their profile information and the information accessible to their connections. In such embodiments, the information retrieved regarding the user's connections may comprise only the content that the user is authorized to access and view at the social networking sites, as set by the user's connections.

In step 350, using the retrieved information, the intermediary server generates a local viewing social network user profile corresponding to the user. In one embodiment, generating the viewing social network user profile comprises creating at least one or more local connections for the user, and providing interconnections between the user and the one or more local connections. In one embodiment, the generating the user profile may further comprise storing one or more of media preferences of the user, media preferences of the user's connections, and a list of user's connections retrieved from the social networking server 130.

In step 350 the system utilizes the information received from the social networking server 130 and generates a user profile at the local viewing social network for the user. In one embodiment, for example, the information retrieved from the social networking server 130 in step 340 comprises a list of connections of the user at the social networking server 130.

In several embodiments, in step 350 the system may create local connections for the user, and may be configured to establish communication channels between the user and the local connections, such that the user can communicate with his/her local connections. According to one embodiment, the intermediary server 120, upon retrieving a list of the user's connections maintained at the social networking server 130, determines one or more local users of the list of user's connections. In one embodiment, the local users refer to users operating one of the one or more client devices 110 in communication with one of the one or more intermediary servers 120. In such embodiments, the local users are established as local connections for the user within the local viewing social network and the viewing social network user profile may include a list of these local connections.

As described above with respect to FIGS. 1 and 2, local users operating client devices 110 coupled to intermediary servers 120 are capable of communicating with one another either directly or through the intermediary servers 120. Thus, the user may be able to view the one or more local connections and establish communication with these local connections to receive media recommendations and/or current media content utilized at the client devices 110 operated by these local connections. Furthermore, the user may be able to provide updates and recommendations to his/her local connections, regarding the media content being utilized by the user at the client device 110. For example, in one exemplary embodiment, the communication may comprise sending/receiving messages to and from the local connections, e.g., receiving viewing status updates from the local connections, sharing media content with the local connections, receiving media recommendations from the local connections and/or recommending media content to the local connections. In one embodiment, the communication may for example be facilitated through a communication protocol such as for example, XMPP, SIP, HTTP, or a proprietary communication protocol. In one embodiment, the communication protocol allows for real time communication.

In one embodiment, further, the information gathered regarding the user's preferences and user's connection preferences is stored within the user profile. In one embodiment, when generating the viewing social network user profile, at some point, e.g., upon receiving a request from the user, the intermediary server may provide the user with a fillable form to receive basic profile information from the user including identification information, photos, or the like. This information may be further included within the user's viewing social network user profile. The viewing social network user profile may further comprise information such as the user's social networking applications, i.e., social networking servers 130 that the user has authorized or indicated as those the intermediary server 120 should communicate with to retrieve information regarding the user, as well as login information, etc.

Referring next to FIG. 4, a flow diagram of the process for initially establishing communication between an intermediary server 120 and one or more social networking servers 130 is illustrated, according to one embodiment of the present invention.

First, in step 410 the intermediary server 120 receives a user request to establish a user profile within a local viewing social network. For example in one embodiment, the user accesses a website associated with a local viewing social network service provided through the intermediary server 120 or subscribes to the viewing social network service through some menu or other means provided to the user at a client device 110. In another embodiment, the device may detect that a new client device or new user at a client device has coupled to the intermediary server and this detection is understood as a request to establish a viewing social network user profile for all users at the new client device or the new user.

Upon receiving the request the intermediary server 120 determines a list of one or more social networking servers 130 that maintain profiles for the user of the client device 110. For example, in one embodiment, the intermediary server may upon receiving the request query the user for such information and receive the information. In another embodiment, the user may provide such information at the time of requesting to establish a user profile within the local viewing social network.

Upon detecting the request, the process of establishing initial communication between the intermediary server 120 and each of the social networking servers 130 indicated as having a user profile corresponding to the user of the client device 110 begins. In one embodiment, the steps 420-450 is performed for each of the social networking servers 130 indicated as having a user profile corresponding to the user of the client device 110.

According to several embodiments, to initiate communication between the intermediary server 120 and the social networking server 130, first an authentication process must be performed. In many instances the authentication for communication with the social networking servers 130 is performed through an HTTP API interaction. One of the most popular and trusted mechanisms employed by many social networking clients and service providers for performing authentication is OAuth which does not allow a application, such as the intermediary server 120, to directly acquire the users password to access the user's information, e.g., profile and connection information, maintained at the social networking server 130. In such instances, to complete the communication linking process, the user must first login directly at the social networking server's website. Thus, in such embodiments, to establish communication between the intermediary server 120 and the social networking server 130 the user must first visit a website of the social networking server 130 and enter his/her login information.

Thus, in step 420, upon detecting that the user wishes to establish a viewing social network profile, the user is redirected to the social networking server website, e.g., Facebook. Once at the website, the user follows the typical login process at the social networking server site. In such embodiment, the social networking server 130, upon receiving the login request authenticates the user login information. At this stage in the process the linking request from the intermediary server 120 is authenticated and the user is returned to the website associated with the intermediary server 120 with a temporary token. FIG. 5 illustrates exemplary screen shots of the process flow for connecting to the social networking server as it appears to the user.

The temporary token is received in step 430 at the intermediary server 120, and the process continues to step 440. In step 440 the intermediary server 120 directly contacts the social networking server 130. Upon contacting the social networking server, in step 450 the intermediary server 120 signs the temporary token and retrieves an actual token from the intermediary server 120. At the conclusion of the process in step 450 the intermediary server 120 is authenticated and in direct communication with the social networking server 130. Once the communication is established, the intermediary server 120 can query the social networking server 130 via HTTP APIs and request information about the user's profile and information maintained at the social networking server 130.

In one embodiment, once the intermediary server 120 has established communication with each social networking server 130, the intermediary server 120 may store the actual token and can use the token in the future to communicate with the social networking server 130 regarding the information for the user without requiring any further action from the user. In such embodiments, the user only has to complete the login process once for each social networking server 130. In some embodiments, the login process may have to be completed each time the user changes their login information at the social networking server website such that the actual token is no longer valid. In other embodiments, the token may have validity duration, and the user may have to revalidate the communication periodically to update the token.

As described above, these steps are performed for each of one or more social networking servers 130 maintaining information regarding the user at the client device 110.

In one embodiment, upon establishing the communication, the standard HTTP methods of communication are used to enable communication between the intermediary server 120 and the social networking servers 130. In one embodiment, HTTP is used for all communications with the social network servers, such as Facebook, Twitter, and any other social networking server 130. According to one embodiment, each of these servers provides an HTTP based API for accessing the connections their users have created which are maintained by these social networking servers.

Figure 6:
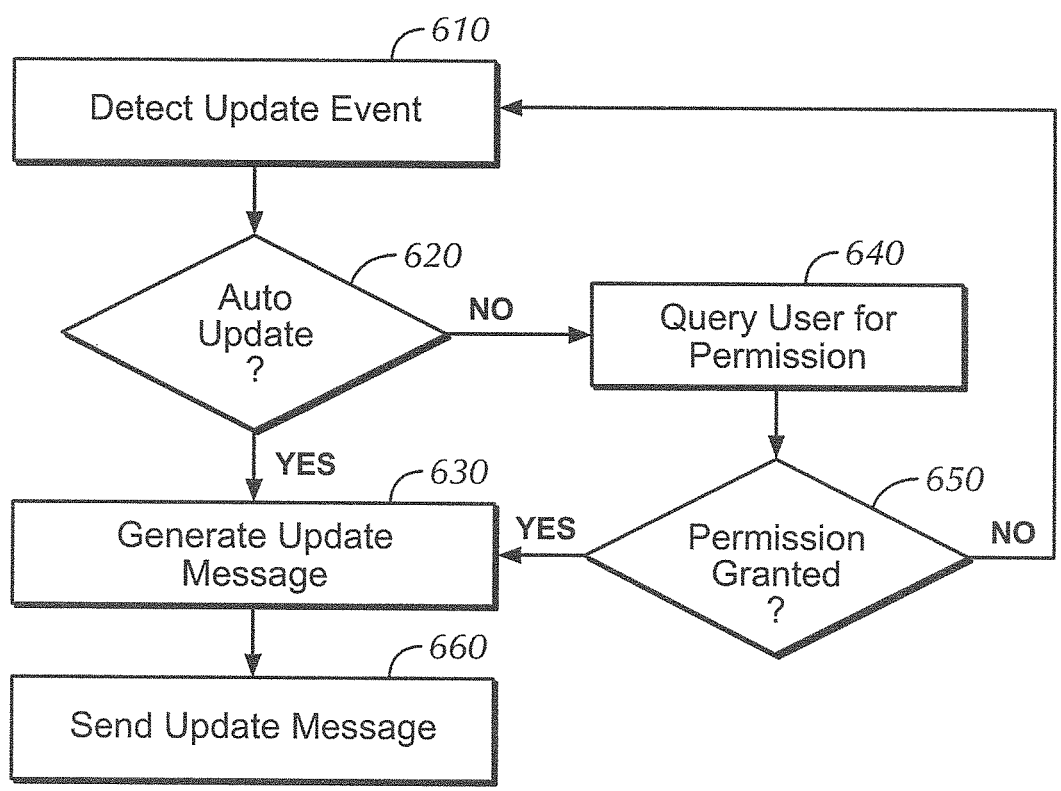
FIG. 6 is a flow diagram of a method for providing updates and push notifications regarding a user's activity at the local client device to the social networking server according to several embodiments of the present invention.

FIG. 6 illustrates a flow diagram of a method for providing updates and push notifications regarding a user's activity at the client device to the social networking server.

As described above, the intermediary server 120 is in communication with the client device 110 in several embodiments. As such, the intermediary server 120 is configured to detect an update event comprising one or more of media related actions taken at the client device 110, changes to the viewing social network user profile, user recommendations, user viewing habits, user local connections, and/or other user actions or data related to the viewing social network.

In step 610, the system detects an update event, i.e., media related actions performed by a user at the client device including for example selecting one or more media content for consumption, and/or actions with respect to the local viewing social network for example through a viewing social network client at the client device. In one embodiment, the intermediary server may monitor the client device 110 and automatically detect update events. In another embodiment, the client device 110 may issue a message to the intermediary server 120 either each time an action is taken or periodically, such that the actions can be stored at the intermediary server 120. In one embodiment, the intermediary server, upon detecting new media related actions performed by the user at the client device, determines that new update information is available for updating the social networking servers 130 in step 610.

In one embodiment, updates may be initiated either each time an update event occurs, periodically, and/or once a certain number or type of update events has been detected. Upon detecting the update event, the intermediary server 120 then determines whether the user wishes to send updates to the one or more social networking servers 130. That is in one or more embodiments, the decision to send an update to the social network is left up to the user. In one embodiment, the authorization may be given on a case-by-case basis, according to the type of action detected or given for all actions taken.

Thus, in step 620 the system determines whether the user has authorized automatic updates, i.e., authorized automatically sending updates to the social networking server 130 without querying the user on a case-by-case basis. In one embodiment, the automatic update authorization may have been activated by the user for all activities and/or the specific type of activity detected during step 610.

If it is determined that the user has authorized automatic updates, then the process continues to step 630 and the system generates an update message. In one embodiment, the update message comprises information about the actions taken at the client device 110. In one embodiment, the message may further comprise one or more API calls for causing the third party client to receive the data and update the user profile at the one or more social networking servers 130.

If on the other hand in step 620 it is determined that the user has not selected the automatic update option, i.e., authorized automatic updates with respect to one or more social networking servers 130 or with respect to the specific type of media action(s) detected as the updated event, in step 640 the system queries the user for permission to send updates to the social networking servers 130. In one embodiment, the user may for example be provided with a notification that an update event has been detected and can grant permission to update the social networking server. In another embodiment, the user can select to view the specific actions that have been detected and can select one or more of those actions to be provided as updates to the social networking server. In yet another embodiment, the user can change the way the action is to be reported to the social networking server 130 before granting permission.

In step 650 the intermediary server 120 determines whether the user has granted permission. If it is determined that the user does not wish to send the update to the social networking server, i.e., no permission was granted, then the process returns to step 610 and begins monitoring for new update events. Otherwise, when the user grants permission to send the update event to the social networking server 130, the process continues to step 630 where the update message is generated as described above.

Once the update message is generated, in step 660 the update message is forwarded to the social networking server 130 over the communication channel established between the intermediary server and the social networking server 130.

In many instance, the API software for communicating with most social networking servers is updated frequently requiring the client device 110 communicating with the social networking server 130 to update their client software to be able to communicate with the social networking server. In several embodiments, the intermediary server provides an intermediary between the social networking server 130 and client device 110. This intermediary functionality of the intermediary server 120 thus provides the client device 110 with a method of communicating with the social networking server 130 and performing actions at the social networking server 130, without the need for updating the software at the client device 110.

In one embodiment, the intermediary server functions as an intermediary and stores the software necessary for the client to communicate with the social networking server. Accordingly, the client device 110 is able to communicate with the social networking server, without having to frequently update the software at the client device 110. Instead, in such embodiments, the API software only resides at the intermediary server and is updated at the intermediary server. The client device 110 in turn is able to communicate with the intermediary server 120 using a proprietary protocol communication, and for example using a intermediary server client or social networking client application executing on the client device, and able to send commands that are to be performed by the social networking server 130 through the intermediary server 120 without the need to store the specific API software. For example, in one embodiment, the communication from the client device 110 to the intermediary server 120 comprises commands issued according to a SONY proprietary protocol. According to several embodiments, the intermediary server receives the commands from the client device 110 and determines the proper API calls to cause the function to be performed at the social networking servers 130.

Figure 7:
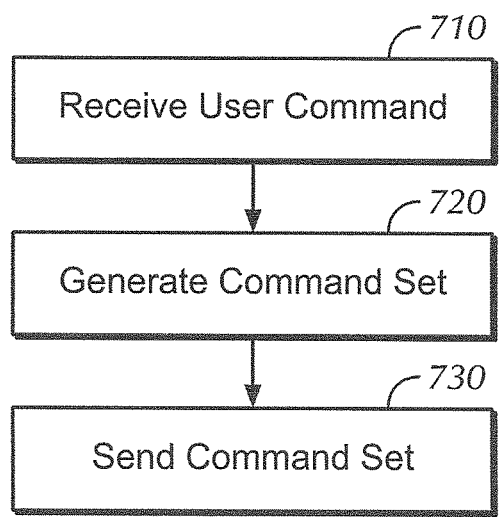
FIG. 7 is a flow diagram of a method for receiving commands from a client device and causing a function to be performed at a social networking server according to several embodiments of the present invention.

FIG. 7 illustrates a flow diagram of a method for receiving commands from a client device 110 and causing a function to be performed at a social networking server 130 according to several embodiments of the present invention.

First, in step 710 a user command is received at the intermediary server. In one embodiment, the user command is received in response to a request being issued from the client device 110, for example through options provided through an intermediary server or social networking client running at the client device 110. In one embodiment, for example, the client device 110, using a proprietary communication channel established with the intermediary server, may issue and transmit a command to the intermediary server for a function to be performed by the social networking server 130. In one embodiment, the command is transmitted to the intermediary server 120 seamlessly without any knowledge of the user operating the client device 110. That is, the user may perform similar steps as where the API software for communicating with the social networking server 130 is stored at the client device 110 itself. In such embodiments, the communication is automatically forwarded from the client device 110 to the intermediary server 120, for example through the social networking client application stored at the client device 110.

Upon receiving the command at the intermediary server, the intermediary server may parse the message containing the one or more commands or communication containing the message to determine the function corresponding to the one or more commands. Furthermore, where multiple social networking servers are available, the intermediary server may be further configured to determine the specific social networking server 130 intended to perform the command.

Next, the process continues to step 720 and the intermediary server 120 generates a command set comprising one or more API calls executable at the intended social networking server 130. For example, in one embodiment, a look up table may be stored at the intermediary server 120, or at a remote storage database communicatively coupled to the intermediary server. In one embodiment, the lookup table may comprise possible user commands and corresponding API calls that perform the function corresponding to the user command. In one embodiment, by using the lookup table, the intermediary server 120 determines a command set comprising one or more API calls to perform the specific function at the intended social networking server 130. In other embodiments, other translation means may be employed to arrive at the command set comprising API calls corresponding to the user command.

Finally, in step 730, the intermediary server sends the command set comprising the one or more API calls to the intended social networking server. In one embodiment, in this step the intermediary server must first establish communication with the social networking server 130. In one embodiment, the standard HTTP methods of communication are used to enable communication between the intermediary server 120 and the social networking server 130. In one embodiment, the one or more API calls are sent through the communication channel created according to the process described in FIG. 4.

In addition to methods for enabling communication, the present system further comprises means for managing and storing the retrieved data associated with the user such as viewing social network information including user profile data, communications with local connections, media preferences information, and local connections and interconnection information. In one embodiment, for example, the open MySQL database server may be employed to provide for storage and maintenance of the data associated with the viewing social network.

To store all data for the customers and their connections, the MySQL Cluster system is employed in several embodiments, which allows for synchronous data transmission between nodes in the MySQL cluster. The benefit of the MySQL Cluster implementation is that it allows for nearly unlimited storage with the added benefit of redundancy. In a MySQL Cluster, memory available is shared across all nodes and each node maintains its own memory space as well as a mirror of another node's data. This comes at the cost of reducing the overall storage per server node but provides the flexibility and reliability needed by a production system. For example, a cluster of 4 servers with 100 GB of storage would have an approximate total redundant storage space of 200 GB, with compression techniques the efficiency of that storage increases while the redundancy and availability remains the same.

Adding social networking to Consumer Electronics devices, i.e., client device 110, can open the door to new and innovative experiences for the customer, not just for navigation and for discovering content but for an array of services.

While the present invention is described with respect to social networking servers, it should be understood by one of ordinary skill in the art that the methods and techniques described above are applicable to all web server based applications maintaining data regarding a user and/or client device 110.

Figure 8:
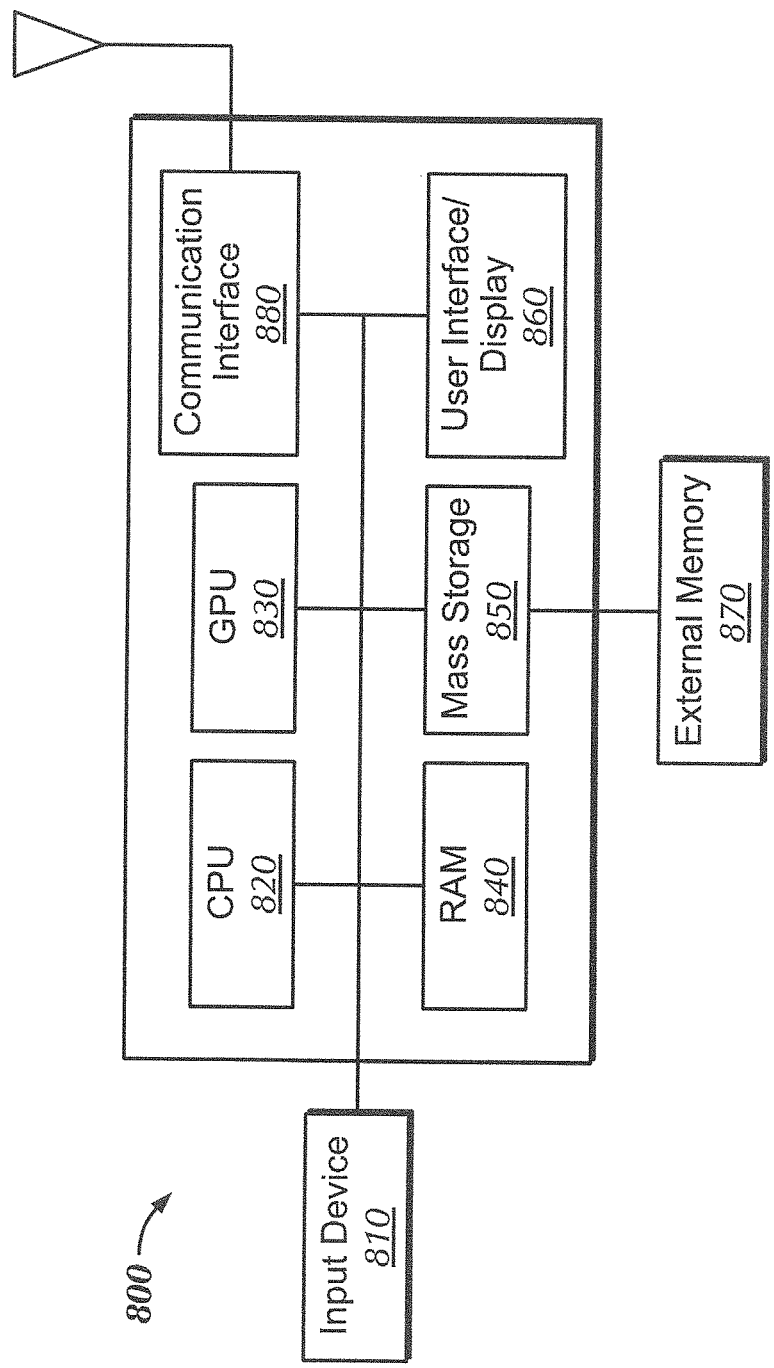
FIG. 8 is a block diagram illustrating a processor-based system that may be used to run, implement and/or execute the methods and/or techniques shown and described herein in accordance with embodiments of the present invention.

The methods and techniques described herein may be utilized, implemented and/or run on many different types of systems. Referring to FIG. 8, there is illustrated a system 800 that may be used for any such implementations. One or more components of the system 800 may be used for implementing any system or device mentioned above, such as for example any of the above-mentioned devices, applications, servers, databases, etc. However, the use of the system 800 or any portion thereof is certainly not required.

By way of example, the system 800 may comprise a User Input Device 810, a Central Processing Unit (CPU) 820, a Graphic Processing Unit (GPU) 830, a Random Access Memory (RAM) 840, a mass storage 850, such as a disk drive, a user interface 860 such as a display External Memory and/or Removable Storage Media 870, and Communication Interface 880. The CPU 820 and/or GPU 830 may be used to execute or assist in executing the steps of the methods and techniques described herein, and various program content, images, games, simulations, representations, communities, interfaces, etc., may be rendered on the user interface 860. The system 800 may further comprise a user input device 810. The user input device may comprise any user input device such a keyboard, mouse, touch pad, game controller, etc. Furthermore, the system 800 may comprise a communication interface 880 such as a communication port for establishing a communication with one or more other processor-based systems and receiving one or more content. In one embodiment, the communication interface 880 may further comprise a transmitter for transmitting content, messages, or other types of data to one or more systems such as external devices, applications and/or servers. The system 800 comprises an example of a processor-based system.

The mass storage unit 850 may include or comprise any type of computer readable storage or recording medium or media. The computer readable storage or recording medium or media may be fixed in the mass storage unit 850, or the mass storage unit 850 may optionally include external memory and/or removable storage media 870, such as a digital video disk (DVD), Blu-ray disc, compact disk (CD), USB storage device, floppy disk, or other media. By way of example, the mass storage unit 850 may comprise a disk drive, a hard disk drive, flash memory device, USB storage device, Blu-ray disc drive, DVD drive, CD drive, floppy disk drive, etc. The mass storage unit 850 or external memory/removable storage media 870 may be used for storing code that implements the methods and techniques described herein.

Thus, external memory and/or removable storage media 870 may optionally be used with the mass storage unit 850, which may be used for storing code that implements the methods and techniques described herein, such as code for generating and storing the tag data described above, performing the initiation of a session, evaluating, and matching of the users. However, any of the storage devices, such as the RAM 840 or mass storage unit 850, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 840, mass storage unit 850 and/or external memory/removable storage media 870, may be used for storing any needed database(s), tables, content, etc.

In some embodiments, one or more of the embodiments, methods, approaches, and/or techniques described above may be implemented in a computer program executable by a processor-based system. By way of example, such processor based system may comprise the processor based system 800, or a computer, entertainment system, game console, graphics workstation, etc. Such computer program may be used for executing various steps and/or features of the above-described methods and/or techniques. That is, the computer program may be adapted to cause or configure a processor-based system to execute and achieve the functions described above. As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer-readable storage medium storing a computer program for use with a computer simulation, the computer program adapted to cause a processor based system to execute steps comprising detecting a user operating a first client device at an intermediary server, wherein the intermediary server is communicatively coupled to one or more client devices including the first client device and further communicatively coupled to one or more other intermediary servers each communicatively coupled with one or more other client devices, establishing communication with at least one social networking server maintaining information corresponding to the user, the information comprising one or more of user preferences, a plurality of user connections, and user connection preferences corresponding to each of the plurality of user connections, querying the at least one social networking server for the information, receiving the information and generating a local viewing social network for the user comprising generating a user profile according to the information, detecting one or more local connections of the plurality of user connections operating a client device of the one or more client devices or the one or more other client devices and establishing direct communication between the user and at least one of the one or more local connections.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware device such as field programmable gate arrays, programmable array logic, programmable logic device or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
   detecting a user operating a first client device at an intermediary server, wherein the intermediary server is communicatively coupled to one or more client devices including the first client device and further communicatively coupled to one or more other intermediary servers each communicatively coupled with one or more other client devices;
   establishing communication with at least one social networking server maintaining information corresponding to the user, the information comprising one or more of user preferences, a plurality of user connections, and user connection preferences corresponding to each of the plurality of user connections;
   querying the at least one social networking server for the information;
   receiving the information; and
   generating a local viewing social network for the user comprising:
   generating a user profile according to the information;
   detecting one or more local connections of the plurality of user connections operating a client device of the one or more client devices or the one or more other client devices;
   establishing direct communication between the user and at least one of the one or more local connections;
   receiving a user command from the user via one of keyboard, mouse, touch pad, and game controller, the user command implemented in a first protocol specific to the first client device to perform at least one function at a first one of the at least one social networking server, the at least one function including at least one of chatting, voice messaging, presence inquiries and updates, content sharing and synchronization, and device control and system messages;
   generating a command set comprising one or more API calls executable at the first one of the at least one social networking server for performing the at least one function; and
   sending the command set to the first one of the at least one social networking server.

2. The method of claim 1, wherein detecting the user comprises receiving a request to generate the local viewing social network from the user at the first client device.

3. The method of claim 1, wherein the user preferences and the user connection preferences comprise multi-media utilization habits.

4. The method of claim 1, wherein the establishing direct communication comprises:
   notifying the user that the one or more local connections have been detected; and
   receiving a user selection of at least one of the one or more local connections from the user.

5. The method of claim 1, wherein the command set is implemented according to HTTP protocol.

6. The method of claim 1, wherein generating the command set comprises looking up the user command in a look up table and determining the one or more commands executable at the first one of the at least one social networking server for performing the function.

7. The method of claim 1, wherein establishing communication with the at least one social networking server comprises:
   detecting a user request to connect to the at least one social networking server;
   detecting a temporary token from the at least one social networking server corresponding to the user;
   contacting the at least one social networking server and exchanging the temporary token to retrieve an actual token, thereby establishing communication with the at least one social networking server with respect to the user.

8. The method of claim 7, further comprising:
   redirecting the user to the at least one social networking server; and
   receiving the temporary token in response to the user connecting to the at least one social networking server.

9. The method of claim 1, further comprising:
   detecting an update event from the user; and
   generating an update command to be executed by the at least one social networking server, wherein the update command will result in updating the information corresponding to the user at the at least one social networking server according to the update event.

10. The method of claim 9, further comprising:
    querying the user for authorization to announce the update event;
    generating the update command upon receiving authorization.

11. A system comprising:
    one or more intermediary servers communicatively coupled to one another and each of the one or more intermediary servers further communicatively coupled to one or more client devices;
    at least one of the one or more intermediary servers comprising a processor configured to perform steps comprising:

detecting a user operating a first client device of the one or more client devices communicatively coupled to the at least one of the one or more intermediary servers;

establishing communication with at least one social networking server maintaining information corresponding to the user, the information comprising one or more of user preferences, a plurality of user connections, and user connection preferences corresponding to each of the plurality of user connections;

querying the at least one social networking server for the information;

receiving the information; and generating a local viewing social network for the user comprising:

generating a user profile according to the information;

detecting one or more local connections of the plurality of user connections operating a client device of the one or more client devices communicatively coupled to the one or more intermediary servers; and establishing direct communication between the user and at least one of the one or more local connections;

receiving a user command from the user via one of keyboard, mouse, touch pad, and game controller, the user command implemented in a first protocol specific to the first client device to perform at least one function at a first one of the at least one social networking server, the at least one function including at least one of chatting, voice messaging, presence inquiries and updates, content sharing and synchronization, and device control and system messages;

generating a command set comprising one or more API calls executable at the first one of the at least one social networking server for performing the at least one function; and sending the command set to the first one of the at least one social networking server.

12. The system of claim 11, wherein detecting the user comprises receiving a request to generate the local viewing social network from the user at the first client device.

13. The system of claim 11, wherein the user preferences and the user connection preferences comprise multi-media utilization habits.

14. The system of claim 11, wherein the establishing direct communication comprises:

notifying the user that the one or more local connections have been detected; and receiving a user selection of the at least one of the one or more local connections from the user.

15. The system of claim 11, wherein establishing communication comprises:

detecting a user request to connect to the at least one social networking server;

detecting a temporary token from the at least one social networking server corresponding to the user;

contacting the at least one social networking server and exchanging the temporary token to retrieve an actual token, thereby establishing communication with the at least one social networking server with respect to the user.

16. The system of claim 11, wherein the processor is further configured to perform the steps comprising:

detecting an update event from the user; and generating an update command to be executed by the at least one social networking server, wherein the update command will result in updating the information corresponding to the user at the at least one social networking server according to the update event.

17. A tangible non-transitory computer readable medium storing one or more computer readable programs adapted to cause a processor based system to execute steps comprising:

detecting a user operating a first client device at an intermediary server, wherein the intermediary server is communicatively coupled to one or more client devices including the first client device and further communicatively coupled to one or more other intermediary servers each communicatively coupled with one or more other client devices;

establishing communication with at least one social networking server maintaining information corresponding to the user, the information comprising one or more of user preferences, a plurality of user connections, and user connection preferences corresponding to each of the plurality of user connections;

querying the at least one social networking server for the information;

receiving the information; and generating a local viewing social network for the user comprising:

generating a user profile according to the information;

detecting one or more local connections of the plurality of user connections operating a client device of the one or more client devices or the one or more other client devices; and establishing direct communication between the user and at least one of the one or more local connections;

receiving a user command from the user via one of keyboard, mouse, touch pad, and game controller, the user command implemented in a first protocol specific to the first client device to perform at least one function at a first one of the at least one social networking server, the at least one function including at least one of chatting, voice messaging, presence inquiries and updates, content sharing and synchronization, and device control and system messages;

generating a command set comprising one or more API calls executable at the first one of the at least one social networking server for performing the at least one function; and sending the command set to the first one of the at least one social networking server.

* * * * *